Nov. 13, 1956 D. V. ZINN 2,770,376
MOTOR VEHICLE BODY OF THE SELF-UNLOADING TYPE
Filed Nov. 5, 1953 2 Sheets-Sheet 1
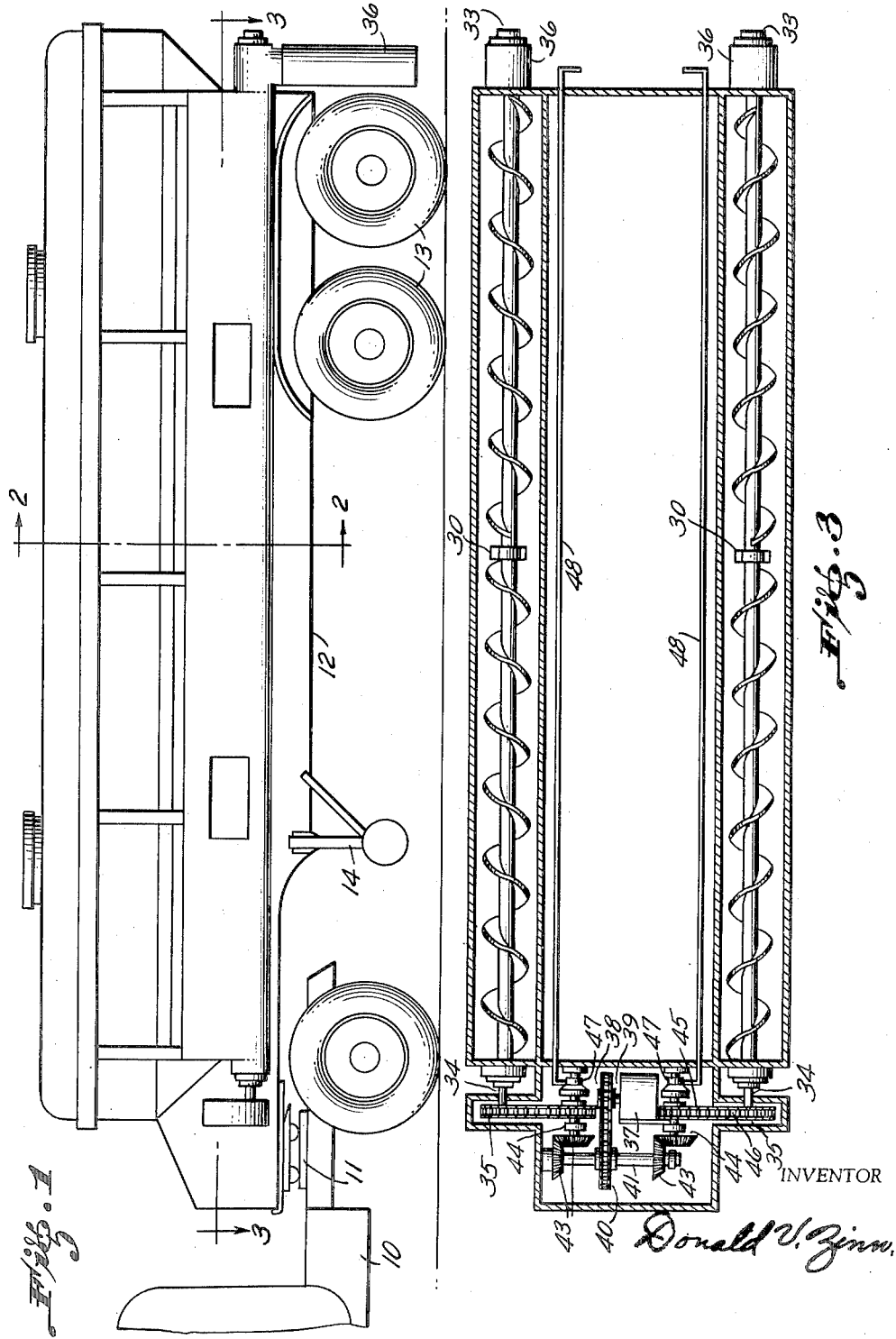
INVENTOR
Donald V. Zinn

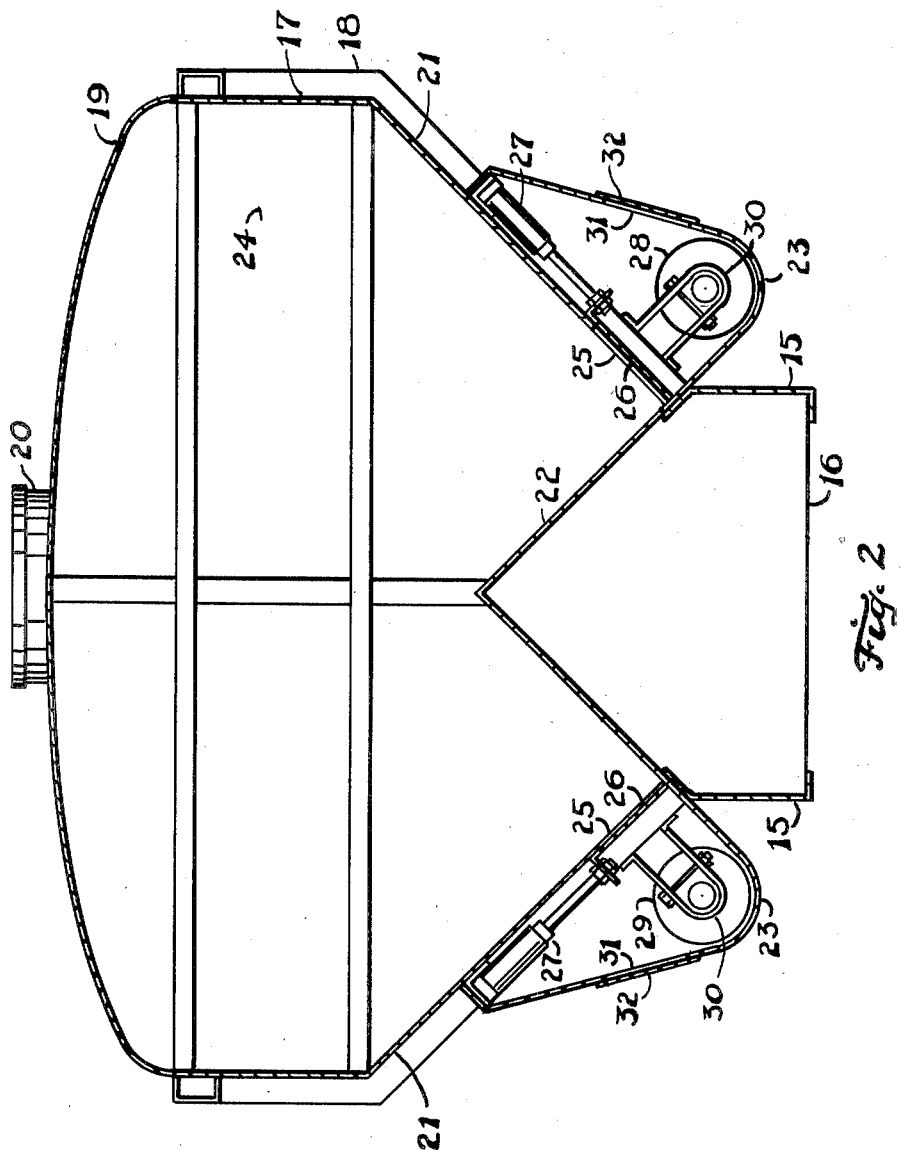

United States Patent Office 2,770,376
Patented Nov. 13, 1956

2,770,376

MOTOR VEHICLE BODY OF THE SELF-UNLOADING TYPE

Donald V. Zinn, Fort Wayne, Ind.

Application November 5, 1953, Serial No. 390,388

2 Claims. (Cl. 214—83.32)

This invention pertains to vehicles and more particularly to a road vehicle of the self-unloading, screw conveyor type for hauling bulk materials such as Portland cement, silica sand and other materials of similar physical properties. The vehicle is equipped with a body or container for the material to be transported. Screw conveyors, installed along the bottom of the body, being driven by power from an engine or motor mounted on the vehicle, provides means of unloading vehicle wherein the term, "self-unloading" is derived.

The invention resides in an improved conveyor system which is located outside the body in a separate tunnel, the shape and position of said tunnel being a part of the invention, and in an improved body structure, compartmentized and equipped with gated openings, which permit unloading the various compartments selectively without regard to their position in the body with respect to the discharge chute.

Further objects of the invention have been to provide greater accessibility to all of the screw conveyor bearings and shafts for servicing and maintenance combined with further improvements in the body structure to render more efficient the operation of the conveyor system.

The improved conveyor system was designed primarily for semi-trailers wherein the forward end of the unit is supported by a tractor and the rearward end is supported by a set of road wheels, although the cross-sectional design of the unit makes it ideally suited for adaption to straight truck units, wherein the unit is wholly supported by a motor truck, or as a full trailer in which the forward end is supported by a dolly having wheels, and the rearward end being supported by a set of road wheels. With the latter arrangement, the vehicle may be pulled behind a straight truck or semi-trailer to form a train for greater pay load and more economical operation. In any of these arrangements it is important to keep to a minimum the weight of the entire combination since vehicles operating over public highways are subject to regulations limiting the weights of the vehicle and their loads.

In previous units of this type the screw conveyor has always been placed in the bottom of a V or a W shaped body and is, when the unit is loaded, completely submerged in the material being transported. Much of the weight of the material rests upon the screw. Many materials tend to settle and pack around the screw while the unit is in transit. Great torque is required to start the screw revolving under these conditions. Heavy screw shafts are required to transmit this torque from one end of the screw to the other, and heavy bearings to support these shafts. Great horsepower in the prime mover are required with corresponding weight problems.

Further, many of the materials to be transported are highly abrasive and the revolving screw forces the materials into the bearings supporting the screw which are submerged in the material. This abrasive action quickly damages the bearings and often renders them inoperative. Nor can they be serviced or inspected while the unit is loaded.

The primary purpose of this invention is to reduce power requirements of the system by placing the screws outside the body where they may be put into operation before the material is fed into them and to provide means of inspecting and servicing or even replacing damaged bearings, shafts, or conveyor sections while the unit is loaded. Also to reduce wear due to abrasive action of the material being handled by providing means of controlling the flow through the system to keep the level below that of the bearings and shafts.

Further objects of the invention are to provide a body which is divided into compartments enabling the operator to divide his load into two or more kinds of materials or grades of materials, to enable him to unload any one of these kinds or grades of materials from the various compartments selectively and individually without regard to its position in the body with respect to the discharge chute, and to run with one or more of the compartments empty or partially filled in order to meet local weight restrictions.

Essentially the body of this vehicle is a W shaped hopper for carrying the material. It is equipped with a roof for keeping the material dry, hatches for loading the material, and controlled openings in the bottoms for emptying the body and regulating the flow into the conveyor system.

In the preferred disclosure, the body is divided into four compartments by bulkheads, the material being discharged through the openings into the screws which convey the material horizontally along separate tunnels to chutes at the rear of the unit where it is discharged. The tunnels have access openings spaced along them covered by removable plates for servicing the screw hanger bearings and shafts. They closely conform to the periphery of the screw so that the revolving screw moves the material rearward by positive displacement.

The driving mechanism consists of a hydraulically driven motor, chains, sprockets, clutches, and gears to drive the system. The clutches are arranged so as to allow either or both screws to remain idle while the motor runs.

Further details and advantages will become apparent in the following detailed description.

In the accompanying drawings, which form a part of the instant specification, and are to be read in conjunction therewith, and in which like reference numerals are used to indicate like parts in the various views:

Figure 1 represents a side elevation of a self unloading semi-trailer embodying one mode of carrying out my invention.

Figure 2 represents a sectional view taken on a line, 2—2 of Figure 1.

Figure 3 represents a sectional view taken on a line, 3—3 of Figures 1 and 2.

Referring now to Figure 1, which discloses a preferred form of the invention, the tractor is indicated generally at 10 having a fifth wheel, 11, for supporting the semi-trailer, 12, at the forward end, the rearward end being supported by sets of road wheels, 13. A landing gear or prop, 14, is mounted under the semi-trailer to support the forward end when the unit is uncoupled from the tractor.

Referring to Figure 2, the chassis consists of longitudinal beams, 15, joined together and cross braced by transverse members, 16. The body, 17, is braced and stabilized by side braces, 18, and is generally W-shaped in cross-section. It consists of a roof, 19, with covered hatches, 20, side walls, 21, bottoms, 22, and tunnels, 23. The body is divided into compartments longitudinally by bulkheads, 24. Openings, 25, are provided at the bottoms of the W-shaped body. Adjustable gates, 26, are actuated by hydraulic or pneumatic pistons, 27. Screw conveyors, 28 and 29, are made in sections supported by hanger bearings, 30. Openings, 31, with covers, 32, provide access to the hanger bearings.

Referring now to Figure 3, in addition to the hanger bearings, 30, supporting the screw, the forward and rearward ends of the screws are supported by outboard bearings, 33, mounted on the ends of the tunnels, 24. Drive shafts, 34, are fixed in the front ends of the screws and extend through the ends of the tunnels. Sprockets, 35, are mounted on the drive shafts by means of which the screws are revolved. Chutes, 36, are provided at the rearward ends of the tunnels through which the material is discharged. A hydraulic motor, 37, is mounted on the forward end of the semi-trailer and its shaft, 38, connected through a sprocket, 39, to a companion sprocket, 40, mounted on a transmission shaft, 41, by means of a roller chain, 42. Miter gears, 43, are mounted on the transmission shaft and on a counter-shaft, 44. Another sprocket, 45, mounted on the counter-shaft is connected by a roller chain, 46, to the sprocket, 35, mounted on the screw drive shaft, 34. Clutches, 47, are mounted on the counter-shaft and are controlled by rods, 48, extending to the rear of the unit.

Materials of construction of the semi-trailer may be mild steel, high tensile steel, aluminum or other common materials of fabrication.

A description of the operation of the invention now follows.

The gates, 26, are closed. The material to be transported is loaded into the body, 17, through the hatches, 20, which are then closed to protect the material. The semi-trailer is then transported to the desired destination.

The motor, 37, is started and the operator moves to the rear of the unit. One or both of the clutches, 47, are engaged using the rods, 48, which sets the screws, 28 and 29, to rotating in opposite directions. Air is supplied to one or more of the pistons, 27, which actuate the gates, 26, allowing material to flow from the body, 17, into the tunnels, 23. By skillful use of the air, the operator can accurately control the flow of the material into the tunnels thus maintaining a level in the tunnel below that of the hanger bearings supporting the screws. The revolving screws move the material rearward horizontally by positive displacement. The material flows by gravity out of the tunnels through the chutes, 36.

By provision of a conveyor system wherein the screws are located outside the body, thereby allowing the system to be set in motion before the material is fed into it, a smaller driving unit may be utilized. It will be observed that the material in any compartment may be discharged without disturbing that in any other compartment regardless of the position of the compartment in respect to the discharge end of the trailer. The virtue of this arrangement is that the material in any compartment may be of any type or kind other than that in any other compartment, making the vehicle adaptable to transporting mixed loads without intermingling.

Another virtue of this arrangement is that any compartment may be left empty or partly filled to hold the total gross weight of the vehicle to that allowed by the various regulating authorities.

Having thus described my invention, I claim:

1. In a semi-trailer for hauling bulk materials, a chassis having at the forward end a fifth wheel for coupling to a tractor and being supported at the rearward end by a set of road wheels, said chassis supporting a body generally of a W-shape in cross-section and having intermediate bulkheads dividing it into a plurality of compartments, each compartment including discharge openings controlled by adjustable gates which are operated by pneumatic pistons, said openings emptying into separate tunnels running longitudinally along the under side of and attached to the body, said tunnels forming troughs conforming closely to the peripheries of a pair of screw conveyors disposed horizontally beside and parallel to the longitudinal centerline of the body, said conveyors operating in conjunction with the forementioned gates, providing means of emptying the forementioned compartments selectively without regard to their respective positions in the body, said conveyor system being driven by a motor mounted on the forward end of the forementioned chassis, said conveyor system, by reason of its location outside the body, being easily accessible for maintenance and servicing of bearings and shafts through openings in the forementioned tunnels.

2. In a semi-trailer for hauling bulk materials, a chassis having at the forward end a fifth wheel for coupling to a tractor and being supported at the rearward end by a set of road wheels, said chassis supporting a body generally of a W-shape in cross-section and having intermediate bulkheads dividing it into a plurality of compartments, said compartments providing means of controlling the weight distribution of the contents of the body, each compartment including discharge openings controlled by adjustable gates which are operated by pneumatic pistons, said openings emptying into separate tunnels running longitudinally along the under side of and attached to the body, said tunnels forming troughs conforming closely to the peripheries of a pair of screw conveyors disposed horizontally beside and parallel to the longitudinal centerline of the body, said conveyors, operating in conjunction with the forementioned gates, providing means of emptying the forementioned compartments selectively without regard to their respective positions in the body and enabling the operator to transport a variety of materials without intermingling, the forementioned conveyor system, by reason of its location outside the body, being easily accessible for maintenance and servicing of bearings and shafts through openings in the forementioned tunnels.

References Cited in the file of this patent

UNITED STATES PATENTS

| | | |
|---|---|---|
| 1,822,530 | Kind | Sept. 8, 1931 |
| 2,060,652 | Arnold | Nov. 10, 1936 |
| 2,290,460 | Winsor | July 21, 1942 |
| 2,412,121 | Bradshaw | Dec. 3, 1946 |
| 2,585,169 | Potter | Feb. 12, 1952 |
| 2,633,255 | Hoffstetter | Mar. 31, 1953 |

FOREIGN PATENTS

| | | |
|---|---|---|
| 138,547 | Australia | Sept. 1, 1950 |